United States Patent [19]

Suzuki

[11] Patent Number: 4,548,495
[45] Date of Patent: Oct. 22, 1985

[54] PROPER FOCUSING STATE DETECTING DEVICE

[76] Inventor: Takeomi Suzuki, 6-38-16, Higashi-Ohizumi-Machi, Nerima-ku, Tokyo, Japan

[21] Appl. No.: 351,603

[22] Filed: Feb. 23, 1982

[30] Foreign Application Priority Data

Feb. 27, 1981 [JP] Japan ................................. 56-27879
Oct. 3, 1981 [JP] Japan ................................. 56-157791

[51] Int. Cl.⁴ ............................................. G07J 1/20
[52] U.S. Cl. ..................................... 356/123; 250/201
[58] Field of Search ......... 356/123; 250/201, 201 PF; 354/25 R, 402

[56] References Cited

U.S. PATENT DOCUMENTS

| | | | |
|---|---|---|---|
| 3,562,785 | 2/1971 | Craig | 356/123 |
| 3,709,579 | 1/1973 | Makosch | 356/399 |
| 3,794,409 | 2/1974 | Johnson | 350/437 |
| 3,875,401 | 4/1975 | Stauffer | 250/201 |
| 4,297,571 | 10/1981 | Utagawa et al. | 250/201 |
| 4,333,716 | 6/1982 | Sakane et al. | 250/201 |
| 4,349,254 | 9/1982 | Jyojiki | 250/201 |
| 4,382,665 | 5/1983 | Eguchi et al. | 250/201 |

*Primary Examiner*—R. A. Rosenberger
*Attorney, Agent, or Firm*—McGlew & Tuttle

[57] ABSTRACT

A device for automatically detecting a proper focusing state of an image-forming optical system e.g. for a photographic camera such as a single-lens reflex camera and the like, comprises a mechanism for splitting a beam of light incident through the optical system. The device does not depend intrinsically upon a current state of polarization of the incident light-beam.

The mechanism for splitting a beam of light comprises a two-component lens arrangement which divides the incident beam of light into two beams of light, and a phase-shifting plate behind one of the components for lengthening the effective optical path of one of the split beams with respect to the other split beam. A first a second array of light-sensing elements is provided for receiving both of the split beams of light for evaluating and comparing the sharpness and other characteristics of the two beams of light.

13 Claims, 9 Drawing Figures

PROPER FOCUSING STATE DETECTING DEVICE

BACKGROUND OF THE INVENTION

1. Field of the Invention

The present invention relates to an improved focus detecting device for use in a photographic camera, and more particularly to an improved device adapted to automatically detect a focusing status of the optical imaging system as incorporated in a photographic image taking apparatus such as a single-lens reflex camera and the like.

2. Description of the Prior Art

Heretofore, there has been proposed the use of a pair of light-receiving or light-sensing element arrays for the detection of a state of focusing such as a proper focusing, a front focusing or a rear-focusing of the optical imaging system as incorporated in a photographic camera and the like in the application of a device for detecting a focusing state thereof. In such an application, it is generally known that there is essentially required a certain means of splitting or dividing a beam of light which passes through the image forming lens system of a photographic camera so that the thus-split beam or beams of light may be directed upon a series of light sensing elements.

Figure 1:
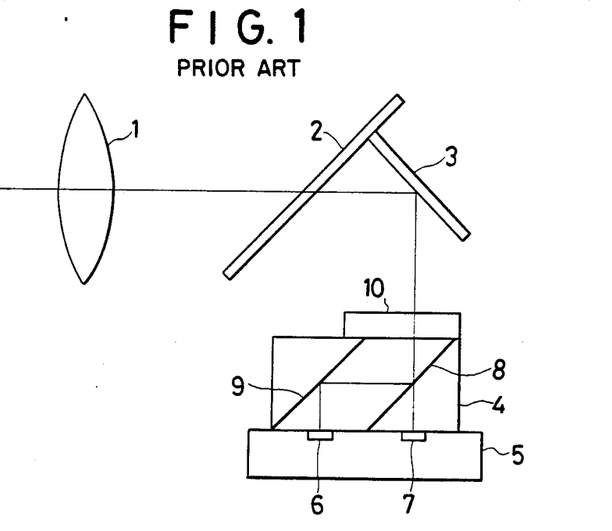
FIG. 1 is a schematic view, in cross-section, which shows the prior art focusing state detecting device.

Now, referring to FIG. 1, there is shown a typical example of such an arrangement which is adapted to detect a proper focusing position of an optical image as obtained in a common optical apparatus by way of an extent of sharpness thereof. FIG. 1 is a schematic view in cross-section taken along a plane which is at a right-angle with respect to a pair of light-sensing element arrays 6 and 7, according to this particular arrangement, there are a series of light-sensing elements, which are arranged in paired first and second arrays 6 and 7 extending in parallel with and at a constant given distance from each other along the optical axis of an image-forming lens 1. The elements are arranged to detect information from a pair of optical images; received from each of the pair of light-sensing arrays so as to obtain the extent of sharpness of the thus-obtained optical information. Sharpness data of each image of the split beams of light from the light-sensing element arrays are compared with each other in accordance with a predetermined evaluation function, thereby to determine which array of light-sensing elements carries data nearer a current position of proper focusing through the optical system. As typically shown in FIG. 1, there is provided an optical beam splitting prism 4, which is adapted to specifically split an incident beam of light from the imaging lens 1 in such a manner that the thus-split beams of light may individually be directed upon the pair of light-sensing element arrays 6 and 7 with a given differential path of light. In practice, it is essential that the split beams of light have properties which are as identical as possible except for their differential paths or routes of travel through the beam-splitting prism. In this respect, it is therefore essential to use a particular caution in the preparation of a semi-permeable membrane 8 for the purpose of splitting a beam of light. More specifically, this particular semi-permeable membrane should necessarily be prepared such that it presents a typical light-splitting ratio of 1 or so, while having an as small as possible light absorption factor to attain an optimal photoconductivity. Since the scene or object to be taken is generally illuminated with white light, it is undesirable to have a possible deviation in the ratio of light-splitting in accordance with the wave length of light. In this connection, when this semi-permeable membrane is made of a metal with deliberate selection of an appropriate material as well as of due conditions in the manufacturing process, it may be attained readily with desired properties, except for an inherent drawback of a substantial loss of light which is as great as 50% or so. While it is expectable to realize a substantial reduction in loss of light with the adoption of a dielectric substance as the material for a semi-permeable membrane in practice, it would undesirably result in a marked extent of variation in the ratios of light splitting with changes in the wave length of light, because of its light interference effect. In addition, there is an inevitable problem of polarization of light which is also intrinsic thereto. That is, to be more strict, it is noted that there is generally observed a certain extent of polarization, more or less, in light which is directed into the image forming or objective lens 1 from an object. Also, since the light incident through the lens 1 is generally then introduced to a light detecting unit 5 through such routing means as a semi-transparent mirror 2 and a reflection mirror 3, the current state of polarization of the light is influenced by the specific optical characteristics of the semi-transparent mirror 2, the reflection mirror 3, etc. Incidentally, since the ratio of light splitting specific to the semi-permeable membrane 8 would practicably be influenced to a substantial extent, by the specific condition of polarization to the then incident light thereto, it is difficult to practice to hold a constant rate of light splitting at substantially 1, unless the current state of polarization of light incident upon the beam-splitting prism 4 is made stable. In this respect, therefore, it would become essential for such construction to provide a suitable polarizer 10 in front of the beam-splitting prism 4, as schematically shown in FIG. 1.

With the employment of such an additional polarizer to the construction of the focusing detection device, however, it is naturally inevitable that there would occur an added loss of light to a substantial extent, as a consequence.

In this respect, the present invention is essentially directed to meet such inconveniences and difficulties as was encountered in the conventional focusing state detecting device for use in a photographic camera or the like which have not been attended with any due countermeasures therefor.

SUMMARY OF THE INVENTION

It is therefore a primary object of the present invention to provide improved means for splitting a beam of light incident through an optical system such as that incorporated in a photographic camera and the like for the purpose of overcoming efficiently such difficulties as experienced in the conventional focusing detection system.

More specifically, it is a specific object of the present invention to provide an improvement in or relating to a focusing detection device wherein there are provided light beam splitting means, which intrinsically do not depend upon any given state of polarization of an incident beam of light, and which can readily be manufactured.

It is another object of the present invention to provide improved means for detecting a proper focusing state of an optical system for use in a photographic camera and the like, wherein the capability of detecting a proper focusing state of the optical system is improved substantially by way of, as evaluation fuctions, not only the sharpness of image formation but also of the shift of a current optical image formed by the optical system.

According to the present invention, there is provided, as briefly summarized, an improved means for detecting a proper focusing state of an optical system for use in a photographic camera and the like including a pair of arrays of light-sensing elements disposed in proximity to the optical image plane of the image-forming lens and adapted to individually measure optical image information so as to be compared with each other, the image-forming lens having its central effective area divided substantially into two areas of transparency through an incident light, which comprises means for splitting a beam of light incident thereto having passed individually through each of the two areas of the image forming lens and introducing the thus-split beam of light onto a corresponding array of light-sensing elements, respectively; and means for lengthening the optical path length of one of the split beams of light having passed through one of the two divided areas of the image forming lens, with respect to the other split beam of light having passed through the other divided areas, whereby the sharpness of an optical image received by each of arrays of light-sensing elements is measure, respectively, and whereby a due position of focusing can accordingly be detected by comparison of the measured sharpness of the optical images of the beams of light incident on each corresponding array of light-sensing means.

The principle, nature and details of the present invention will, as well as advantages thereof, become more apparent from the following detailed description by way of a preferred embodiment of the invention, when read in conjunction with the accompanying drawings, in which like parts are designated with like reference numerals.

DETAILED DESCRIPTION OF THE PREFERRED EMBODIMENT OF THE INVENTION

The present invention will now be described in details by way of example and preferred embodiments thereof in conjunction with the accompanying drawings.

Figure 2:
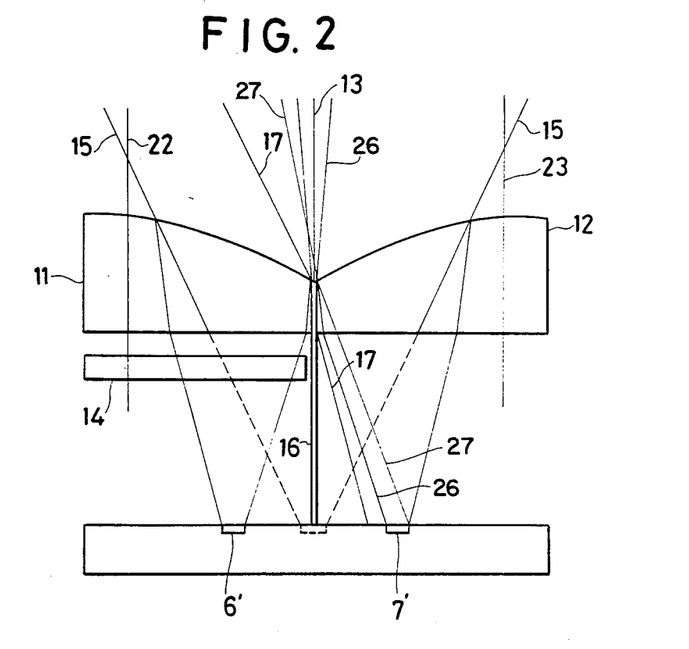
FIG. 2 is a similar cross-sectional view, showing an improved focusing detection device according to a preferred embodiment of the present invention.

Referring now to FIG. 2, there is schematically shown the typical arrangement of an improved focusing state detecting device according to the present invention, wherein there are arranged a series of light-sensing elements extending in paired and parallel first and second arrays, in cross-section taken along a plane perpendicular with respect to the paired arrays. In this drawing, it is noted that unit light-sensing elements disposed in each of the paired parallel arrays shown in cross-section taken along the mentioned vertical plane are designated at 6' and 7', respectively. Also shown are component lenses 11 and 12, which are specifically split and independent lens having optical axes 22 and 23 independent from each other designed for the purpose of reforming separate images, respectively, of an identical part of an optical image as that being formed by the image forming or objective lens 1 onto the corresponding series of light-sensing elements 6' and 7' arranged in the paired arrays mentioned above, which are offset from the optical axis 13 of the objective lens 1. According to such an arrangement, it is noted that a beam of light as designated at 15 from the image forming lens 1 is now introduced into the effective areas of the mentioned two split lenses 11 and 12, whereupon it has its wave surface divided into two so as to be directed properly into each of the series of light-sensing elements in the paired arrays, respectively. In this connection, the split lenses 11 and 12 may either be disposed entirely independently in such a manner that one of the lenses is complementary with a corresponding one of the paired light-sensing elements and the other lens with the other, or may be of an independent and cylindrical form which are disposed to be complementary with the paired light-sensing arrays, respectively. Also, lenses may be ordinary spherical lens, complimentary with the paired light-sensing arrays.

Figure 3:
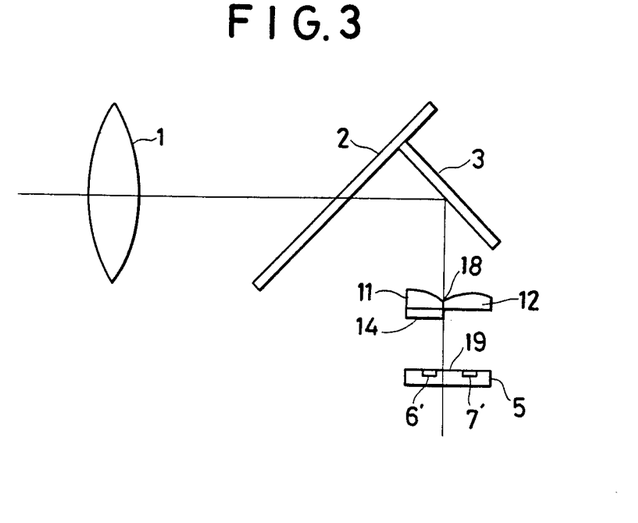
FIG. 3 is a schematic view showing a locational relationship of component elements involved in the optical system of the invention along a boundary line of light beam splitting.

There is also provided a means or member 14 for lengthening the optical path length which is adapted to bring an appropriate difference in the total distances or lengths of travel of light beams to be directed into the first and second arrays of light-sensing elements, whereby there is provided a like difference in the paths of light beams as attained from the beam-splitting prism 4 shown in FIG. 1. In this application, it is also appreciated that these split lenses 11, 12 and the member 14 may either be formed from separate materials, or any one of these elements may be formed integrally with each other, as well. By virtue of such a specific arrangement according to the present invention that the incident beam of light is split with its wave surface into two by way of the effective areas of the independent split lenses 11 and 12, unlike the case that it is divided by way of the so-called amplitude splitting by using the semipermeable membrane 8 as shown in FIG. 1, there is less susceptibility to the effect of polarization or wave length of a beam of light, as well as a minimal degree of lost light, which means an exceptionally high assurance of an optimal state of splitting of a beam of light. Also, there is attained a substantial readiness in the manufacture of such arrangement from such an advantage that the split lenses 11, 12 and the member 14 may as well be formed integrally of a suitable material such as an optical plastic resin or the like. Since part of the light passing through the lens 11 is let into the light sensing element 7', or vice-versa, thus bringing a possible cause of confusion of image signals between the paired light-sensing element arrays, which would result in an error or malfunction, an opaque light barrier 6 is preferably provided between the lenses 11, 12. Or else, if adjustment is made on the optical power of these lenses 11 and 12, or on the distance between the paired arrays of light-sensing elements, in order to effectively prevent a ray of light 17, which most possibly reaches the light-sensing element 7' on the light-receiving surface of the system among those having passed through the split lens 11, from entering into that element 7', there would be no need for the provision of the barrier 16. Now, with respect to the rays of light passing through the lens 12 disposed opposite an lens 11, it may be considered in the entirely like manner. Incidentally, in the case that there are provided the semi-transparent mirror 2 and the reflecting mirror 3 on the rear part of the image forming lens 1 as shown in FIG. 3, because of a substantial dependency of the reflection factor or the permeability of these mirrors upon the angle of incidence of the beam of light thereto, there would very possibly occur a deviation in the amplitudes of such beams across the current wave surface involved, and therefore, when there exists the boundary line 18 between the effective areas of the component lenses 11 and 12 at such a point 19 intermediate the paired arrays of light-sensing elements 6' and 7', there would be a possibility of imbalance as occurred in the intensity of a current incident beam of light between these paired arrays of light-sensing elements. Under such a circumstance, however, such an attempt may be taken as a balancing adjustment to cancel such a differential intensity of light either to initially offset one of the light-sensing element arrays closer that boundary line 18, or to insert a suitable grey filter or spatial filter at an appropriate point in the front or rear of the split lenses 11 and 12. In this connection, taking into consideration fact that the both split lenses 11 and 12 are designed to optically separate the image formed by the objective lens 1 by way of the splitting in the wave surface of an incident beam of light thereto so as to focus an individual image oppositely aside from or across the optical axis 13 of that objective lens from each other, it is equally feasible in practice to utilize a pair of prisms 20, 21 having flat surfaces disposed in a back-to-back relation as typically shown in FIG. 4, in place of the split paired lenses mentioned above, so as to cause both separated beams of light having passed therethrough to be refracted, thereby to afford the same effect, as desired.

Figure 5:
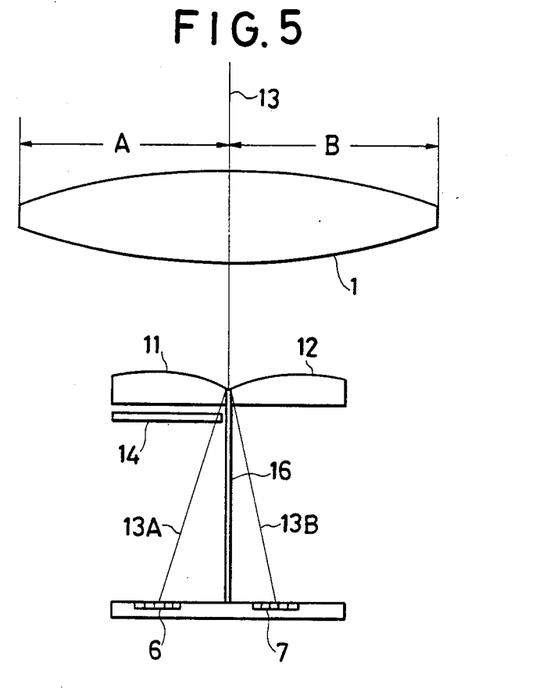
FIG. 5 is a schematic view, which shows, in cross-section, another embodiment of the invention wherein a series of light-sensing elements are arranged in the same straight line.

Next, referring to FIG. 5, there is shown another embodiment of the present invention wherein the paired arrays of light-sensing elements 6 and 7 are aligned along the same straight line. In order to prevent a possibility of confusion of mutual image signals between these two arrays of light-sensing elements aligned with each other as mentioned above, it is again preferred to dispose a similar barrier 16 to the one in the embodiment shown in FIG. 2 between the arrays, or to adjust the optical powers of the split lenses 11 and 12 or the physical gap between the arrays so as to prevent possible scattering of the light into the arrays.

Referring to FIG. 5, it is likewise feasible to detect a proper focusing state from the due evaluation of a current image sharpness with the employment of the member 14, as attained in the case of FIG. 2, or else, without the use of the optical length variation member 14, and with the due detection of a relative shift of location of optical images incident upon each of the light-sensing element arrays which is observed along the direction of extension of these arrays, it is practicable to attain the detection of a proper focusing state of the system, accordingly.

The term "the detection of a proper focusing state by way of the detection of shift of location of an optical image" as used hereinabove is meant to define a specific art as described below. For a general idea, according to the arrangement as typically shown in FIG. 5, it is noted that the split lenses 11 and 12 are disposed so as to split the light beam incident on the image-forming lens 1, by the splitting boundary plane that includes the optical axis 13 of the image-forming lens 1 and is perpendicular to the direction of the array of light-sensing elements, and the effective area of the image-forming lens 1 is divided into two areas, A and B, correspondingly, and the first array of light-sensing elements 6 is disposed in such a location to specifically detect an optical image formed from the half beam of light having passed through the area A of the lens 1. The second array of light-sensing elements 7 is disposed in such a location to specifically detect an optical image formed from the beam of light having passed through the half area B of the lens 1. With such arrangement, now that both optical images would coincide spacewise with each other at a proper focusing position of the image-forming lens 1, when there are disposed no split lenses or the like according to this invention, while these images would then deviate laterally oppositely from each other in the direction parallel with respect to the arrays of light-sensing elements when there occurs out of focus, in a manner such that the relative spatial relation between these images becomes inversed, depending on front focus or rear focus (the image-forming lens 1 being focused in front of the object or behind the object), respectively, Therefore, it is made possible in practice to detect whether it is a proper focusing, or whether it is a front or rear focusing, from the due detection of such a current lateral extent of deviation or shift location of the optical images off from the due focusing position. According to the specific arrangement of the invention wherein the split lenses 11 and 12 are disposed in the paths of light beams from the image-forming lens 1, the optical images as formed optically independently are directed into the paired arrays of light-sensing elements, respectively. With this arrangement, it is now possible in practice to detect both optical images separately from each other free from any undesired interference therebetween, thereby making it feasible to detect shifts of location of these images optically independently on the basis of the dual optical axes 13A and 13B which are the optical axes refracted by the split lenses consequently, it is eventually practicably to attain the due detection of a proper focusing position of the optical system, accordingly.

Figure 6:
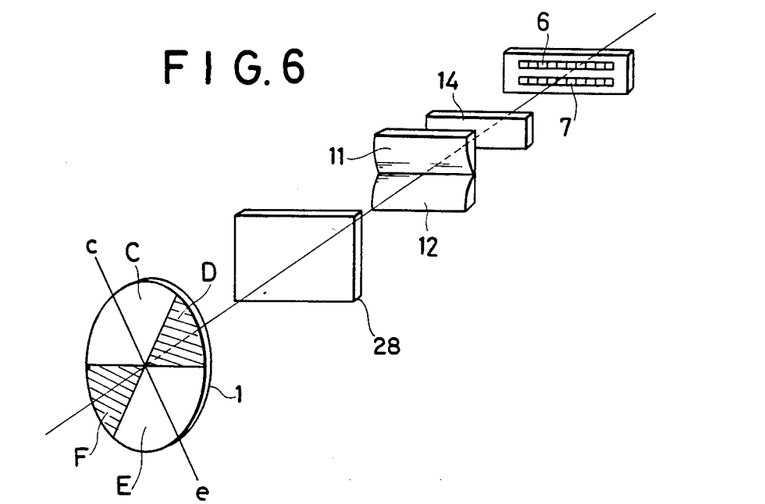
FIG. 6 is a perspective view showing schematically an embodiment of the invention wherein the effective center area of an image forming lens is divided into four work sections.

By the way, according to the arrangement of the invention as shown in FIG. 5, it is feasible in practice to provide a versatility in use not only with the detection of the sharpness of an optical image obtained with the aid of the mentioned member 14 or an element which is optically equivalent thereto, but also or by option with the detection of the relative shift of location a current optical image (the spatial deviation of the position of a current image in a plane perpendicular to the optical axis of the image-forming lens), in such a manner that either of the focusing state detecting systems may be selected for use as desired according to a given condition. In this connection, for the detection of spatial phase slip of a current optical image, there would possibly occur a substantial influence of the optical length variation member 14, and therefore, it is preferred to provide a due correction appropriate to compensate for an amount of that influence for the attainment of a proper focusing, or else it may be neglected for a rough detection purpose, as well. For attaining such an effect of versatility in use of the dual detection species of a proper focusing stae as stated above, it is also practicable with the arrangement as schematically shown in FIG. 6.

Now, according to the arrangement shown in FIG. 2, it is noted that there is introduced an individual beam of light having passed through each of the divided areas in the effective portion of the image-forming lens 1 (not shown in FIG. 2) onto each of the first and second arrays of light-sensing elements 6 and 7, respectively. In such arrangement, as the divisional direction on that lens is orthogonal with respect to the orientation of the extension of the paired arrays of light-sensing elements, or in other words, with the boundary line of division of the area of the image-forming lens 1 extending in parallel with respect to the extension of the arrays of elements, there occurs the relative shift of location of current optical images in the corresponding right-angled relationship with respect to the arrays of elements when there exists a state of defocusing or out-of-focus state in the image-forming lens, and consequently, it is impracticable to detect such a defocusing state as it is. To cope with this situation, as typically shown in FIG. 6, there is provided such an arrangement that the effective area of the image-forming lens 1 is divided into four sections in such a manner that one side of the thus-formed sectors is disposed in a parallel relationship with the extension of the paired arrays of light-sensing elements, while the other side thereof extending at a certain angle therewith of these four sections or sectors thus-divided, only the two located in diagonal relationship with each other, e.g., the sectors C and E, or D and F as shown, are made transparent to the incident beams of light passing therethrough. With such a construction, the individual beams of light having passed through the sectors C and E are directed into the corresponding first and second arrays of light-sensing elements 6 and 7, respectively. As apparent from the figure, the central line c-e of averaged areas of such division of the central portion of the lens 1, i.e., the line passing through the gravity centers of the divided transparent areas of the lens, is oriented at a certain angular relation with respect to the arrays of light-sensing elements 6 and 7. It therefore is to be noted that the current deviation or relative shift of location phase in the current optical images obtained in the direction c-e with an out-of-focus state of the image-forming lens, 1 would naturally include the components of the relative shift of location as involved in the direction of extension of the arrays of elements. As a consequence, as long as there exists no significant changes in the optical structure of an object to be taken in the direction orthogonal with respect to the arrays of elements, it is now possible in practice to detect not only the current sharpness of an optical image, but also the current extent of location shift with the use of the paired arrays of light-sensing elements of such construction, thereby to provide an advantageous versatility of dual focusing detection available for either contemporary use or selective use, as the case may be.

Now, as the optical images which are formed of the beams of light having passed through the two sectoral areas C and E of the lens 1 and directed onto the paired parallel arrays of light-sensing arrays 6 and 7, respectively, would bring a relative shift of location not only in the direction of extension of the arrays of light-sensing elements, but in the direction orthogonal with respect to the direction of extension of the arrays of elements are disposed, as well, these optical images as detected by way of the arrays of light-sensing elements 6 and 7 would eventually shift out of their mutual correlation as the extent of relative shift of location of the optical images grows greater, particularly when there occurrs an abrupt change in the optical construction of an object to be taken in the direction orthogonal with respect to the extension of the arrays of light-sensing elements 6 and 7, and consequently, it would then be difficult or even impossible in practice to attain a proper detection of such a relative shift of location as occurring in the direction of extension of these element arrays or a due comparison of a current sharpness of the images. To cope with such a situation, it is proposed to dispose a suitable space filter 28, such as a diffraction grading or a cylindrical lens, which is adapted to produce a due extent of diffraction, scattering, aberration or the like in the direction orthogonal with respect to the direction of extension of the arrays of light-sensing elements 6 and 7, across the path of incident light, so it may eliminate that abrupt change (that is, average the light intensity) in the optical images extending in the direction orthogonal with respect to the arrays of light-sensing elements 6 and 7, respectively. The advantageous dual system of detecting a proper focusing may likewise be applied satisfactorily beyond such limiting condition in use, as in the case stated above.

In this connection, the object to have the effective area of the image forming lens 1 divided generally into four sections and the thus-obtained sectoral sections D and F, or C and E being made opaque or non-transparent to the incident light thereto may be attained with the employment of a spatial filter which is to be placed immediately upon or independently at a given distance away from the split lenses 11 and 12, respectively.

Figure 7:
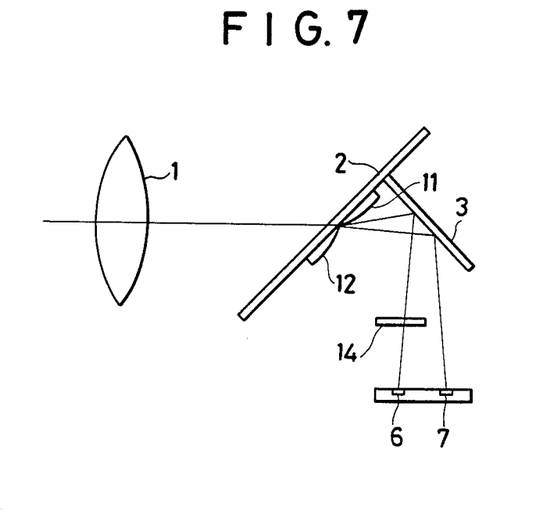
FIG. 7 is a schematic view showing still another embodiment, wherein a split lens according to the invention is installed upon a quick-return mirror.
Figure 8:
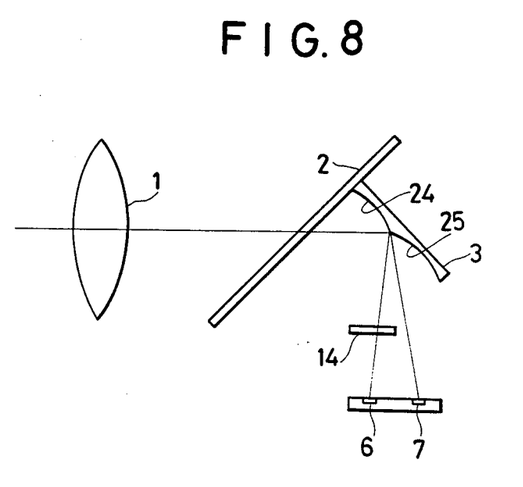
FIG. 8 is a similar view showing schematically a further embodiment of the invention, wherein a concave mirror is employed.

While the description herein is presented exclusively on the typical embodiments of the invention wherein there are provided the split lenses 11 and 12, it is a matter of course that any other means such as a prism, a reflector mirror, or the like than this type of split lens may as well be applied for use, as long as such means have an equivalent optical effect or properties to those of such split lens. Also, such optical elements may naturally be located in any other suitable position than the immediate front of the individual array of light-sensing elements. Now, referring to FIG. 7, there is shown a typical embodiment wherein the split lenses 11 and 12 similar to those in the previous embodiments shown herein are mounted immediately upon the quick-return mirror of a single-lens reflex camera. Another preferred embodiment of the invention is shown in FIG. 8, wherein there is provided a reflector mirror 3 having two separate concave reflecting surfaces 24, 25 upon the quick-return mechanism of the similar construction so as to attain an identical effect.

Now, with respect to the art that an incident beam of light is divided into two parts in terms of its wave surface by way of such typical optical means as a lens, a prism or a reflector mirror, as discussed herein, it is to be noted strictly that the wave-division theory may properly be used only in the effective area of such optical means as a lens, a prism, a reflector mirror, and the like, and even more strictly, in the application of the image forming lens as used in the invention, what is expectable is a division into approximately two parts. In this respect, therefore, there is attainable in a strict sense no accuracy in the provision of a boundary of such division of an area, as such a perfect theoretical segment or so. For a ready instance, according to the arrangement as schematically shown in FIG. 2, as the light-receiving opening of the light-sensing element 7' has a practical widthwise extension to a substantial extent, it is noted that the ray of light entering into the left corner of the light-receiving opening is comprised essentially of that having passed through the area of the right half central effective part of the image forming lens not shown (the ray which most reaches to the left is shown at 26 in FIG. 2), while in actuality, the rays of light which have passed through the left-half central part of the same image forming lens is found to be included in the light beam entering into the right corner of that light-receiving opening (the ray which most raches to the left, 27, is shown as such a ray). Notwithstanding this, however, when taking the matter on average, in the majority the rays of light having passed through the right-half area of the image forming lens would enter into the light-sensing elements 7', while the rays of light having passed the left half area of the same lens would now enter into the light-sensing elements 6', respectively. Thus there is no fear that the essential advantageous effect of the present invention would be affected to a substantial extent, after all.

Figure 9:
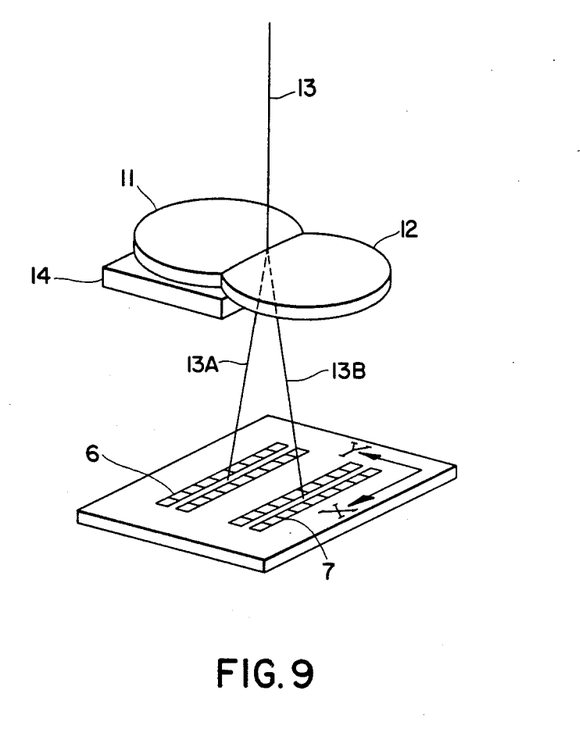
FIG. 9 is a perspective schematic view showing an embodiment wherein the light sensor arrays comprise plural sub-arrays.

With respect to the specific construction of the light-sensing elements are practiced in the typical embodiments of the invention, it is noted that according to the embodiment shown in FIG. 2, the arrays of light-sensing elements are disposed extending in the orthogonal relationship with respect to the plane of of the drawing, while in the embodiment shown in FIG. 5, they are aligned in parallel with respect to the plane of the drawing, respectively. In this connection, it is practicable to use a combination of these two arrangements of light-sensing elements, as the case may be. More specifically, taking for instance the arrangement shown in FIG. 2, wherein there are provided two arrays of light-sensing elements 6 and 7 in the parallel relationship with each other, at least one of these arrays of elements may be added with another or more arrays of elements extending in a parallel relationship therewith, or in other words, there may be provided a plurality of series of elements arranged in a parallel relationship with each other on the part of at least one of these paired arrays. An embodiment where both the rays 6 and 7 comprise two parallel subarrays, respectively, is shown in FIG. 9. With such a modification in arrangement, when applied with the constructions as shown in FIG. 2, it is then attainable in practice with a proper-focusing signal by way of the method of sharpness comparison of optical images based on an optical information in terms of the direction orthogonal with respect to the plane of the drawing (in FIG. 2 (X direction in FIG. 9), while with a like focusing signal by way of the method of detecting a current extent of the relative shift of location of optical images based on an optical information in terms of the direction parallel with the plane of the drawing in FIG. 2 (Y direction in FIG. 9). As a consequence, according to such modification, it is not necessarily essential in construction to provide a spatial filter as shown in the embodiment of FIG. 8.

Figure 4:
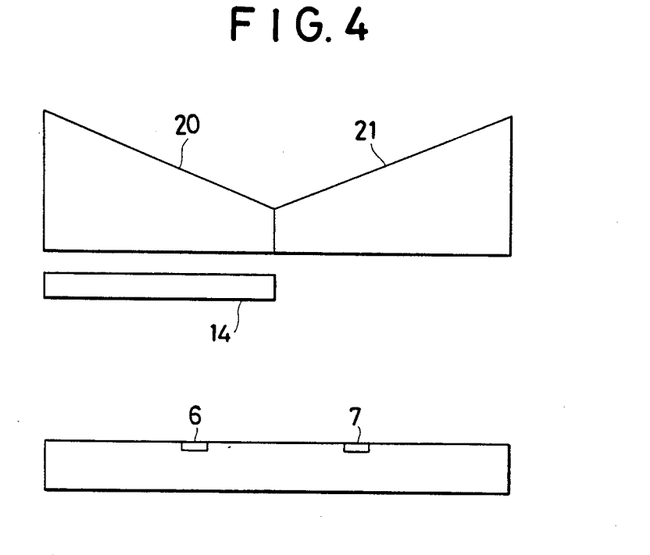
FIG. 4 is a schematic view showing an embodiment wherein a beam of light is to be split by way of a plane prism.

In the construction that there are one or more arrays of light-sensing elements disposed in a parallel relationship with each other on the part of at least one of these arrays of elements 6 and 7 extending in a parallel relationship, when applying the prism as shown in FIG. 4 or reflector means having a roof-like shape as means of splitting a beam of light, there is a possibility such that the plane of optical image formation would undesirably be inclined with respect to the arrays of light-sensing elements as the optical axis of the image forming lens is caused to be refracted with the use of such light-beam splitting means, which is inconvenient from the viewpoint of improvement in the accuracy of detection of an image forming plane in the system. In order to prevent such an inconvenience from occurring in use, it is preferred that there is provided a convex lens having a focal point near the central area of that light-beam splitting means mentioned above and extending over the general area of these paired arrays of light-sensing elements in the immediate front of the arrays, so that the questioned plane of image formation may be disposed in generally parallel fashion with respect to the plane of these paired arrays of light-sensing elements, accordingly.

It is now clear that the objects as set forth hereinbefore among those made apparent from the preceding description are efficiently attained, and since certain changes and modifications may be made in the foregoing teaching without departing from the spirit and scope of the invention, it is intended that all the matter contained in the foregoing description or shown in the accompanying drawings shall be interpreted as illustrative and not in any way limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A focus detecting system for detecting a focus position of an image forming optical system into an object, said optical system having an image forming lens and a predetermined focal plane, said detecting system comprising:
    (A) dividing means for substantially dividing an effective area of said image forming lens of said optical system into two divided areas;
    (B) a pair of sensor arrays of light sensing elements, each of said sensor arrays being disposed to accept each of two divided light beams which have passed through each of said divided areas of said image forming lens, respectively, said sensor arrays being disposed in orthogonal relationship to the direction of a line connecting gravity centers of said divided areas of said image forming lens;
    (C) spatial filter means disposed between said pair of sensor arrays and said image forming lens, having transparent areas such that the direction of a line connecting gravity centers of said divided light beams, after having passed through said spatial filter means, has a selected angular relationship to a direction of extent of said sensor array; and (D) means for lengthening the optical path length of one of said divided light beams compared to that of the other divided light beams, whereby the focus position of the optical system is detected, not only by way of the detection of a relative shift of location of the optical images of said divided light beam, but also by way of the detection of a difference between the sharpness of the optical images of said divided light beams from image signals of said sensor arrays.

2. A focus detecting system as claimed in claim 1, further comprising:

(E) means for averaging light intensity only in a direction orthogonal to the direction of extent of said sensor arrays, whereby said image signals become insensitive to a shift of location of said optical images in the direction orthogonal to the direction of extent of said sensor arrays.

3. A focus detecting system as claimed in claim 1, wherein said dividing means comprises two lens means, each having an independent optical axis corresponding to each of said sensor arrays.

4. A focus detecting system as claimed in claim 1, wherein said dividing means comprises two mirror means, each having an independent normal at its center corresponding to each of said sensor arrays.

5. A focus detecting system as claimed in claim 1, wherein said dividing means comprises two prism means, each having a surface with an independent normal corresponding to each of said sensor arrays.

6. A focus detecting system for detecting focus position of an image forming optical system onto an object, said optical system having an image forming lens and a predetermined focal plane, said detecting system comprising:

(A) dividing means for substantially dividing the effective area of the image forming lens of said optical system into two divided areas;

(B) a pair of sensor arrays of light sensing elements, each of said sensor arrays being disposed to accept each of two divided light beams which have passed through each of said divided areas of said image forming lens, respectively, said sensor arrays being disposed in orthogonal relationship to the direction of a line connecting gravity centers of said divided areas of said image forming lens;

wherein at least one of said sensor arrays comprises plural parallel sub-arrays of light sensors; and (C) means for lengthening the optical path length of one of said divided light beams compared to that of the other divided light beam, whereby the focus position of said optical system is detected, from the image signals of said sensor arrays, not only by way of the detection of a relative shift in the direction orthogonal to the direction of said sensor arrays between the locations of the optical images of said divided light beams, but also by way of the detection of a difference between sharpnesses in the direction parallel to the direction of said sensor arrays of the optical images of said divided light beams.

7. A focus detecting system as claimed in claim 6, wherein said dividing means comprises two lens means, each having an independent optical axis corresponding to each of said sensor arrays.

8. A focus detecting system as claimed in claim 6, wherein said dividing means comprises two mirror means, each having an independent normal at its center corresponding to each of said sensor arrays.

9. A focus detecting system as claimed in claim 6, wherein said dividing means comprises two prism means, each having a surface with independent normal corresponding to each of said sensor arrays.

10. A focus detecting system for detecting focus position of an image forming optical system onto an object, said optical system having an image forming lens and a predetermined focal plane, said detecting system comprising:

(A) dividing means for substantially dividing the effective area of the image forming lens of said optical system into two divided areas;

(B) a pair of sensor arrays of light sensing elements, each of said sensor arrays being disposed to accept each of two divided light beams which have passed through each of said divided areas of said image forming lens, respectively, said sensor arrays being disposed in orthogonal relationship to the direction of a line connecting gravity centers of said divided areas of said image forming lens;

wherein at least one of said sensor arrays comprises plural parallel sub-arrays of light sensors; and means wherein the focus position of said optical system is detected by way of the detection, from the image signals of said sensor arrays, of a relative shift in the direction orthogonal to the direction of said sensor arrays between the locations of the optical images of said divided light beams.

11. A focus detecting system as claimed in claim 10, wherein said dividing means comprises two lens means, each having an independent optical axis corresponding to each of said sensor arrays.

12. A focus detecting system as claimed in claim 10, wherein said dividing means comprises two mirror means, each having an independent normal at its center corresponding to each of said sensor arrays.

13. A focus detecting system as claimed in claim 10, wherein said dividing means comprises two prism means, each having a surface with independent normal corresponding to each of said sensor arrays.

* * * * *